United States Patent Office 3,672,769
Patented June 27, 1972

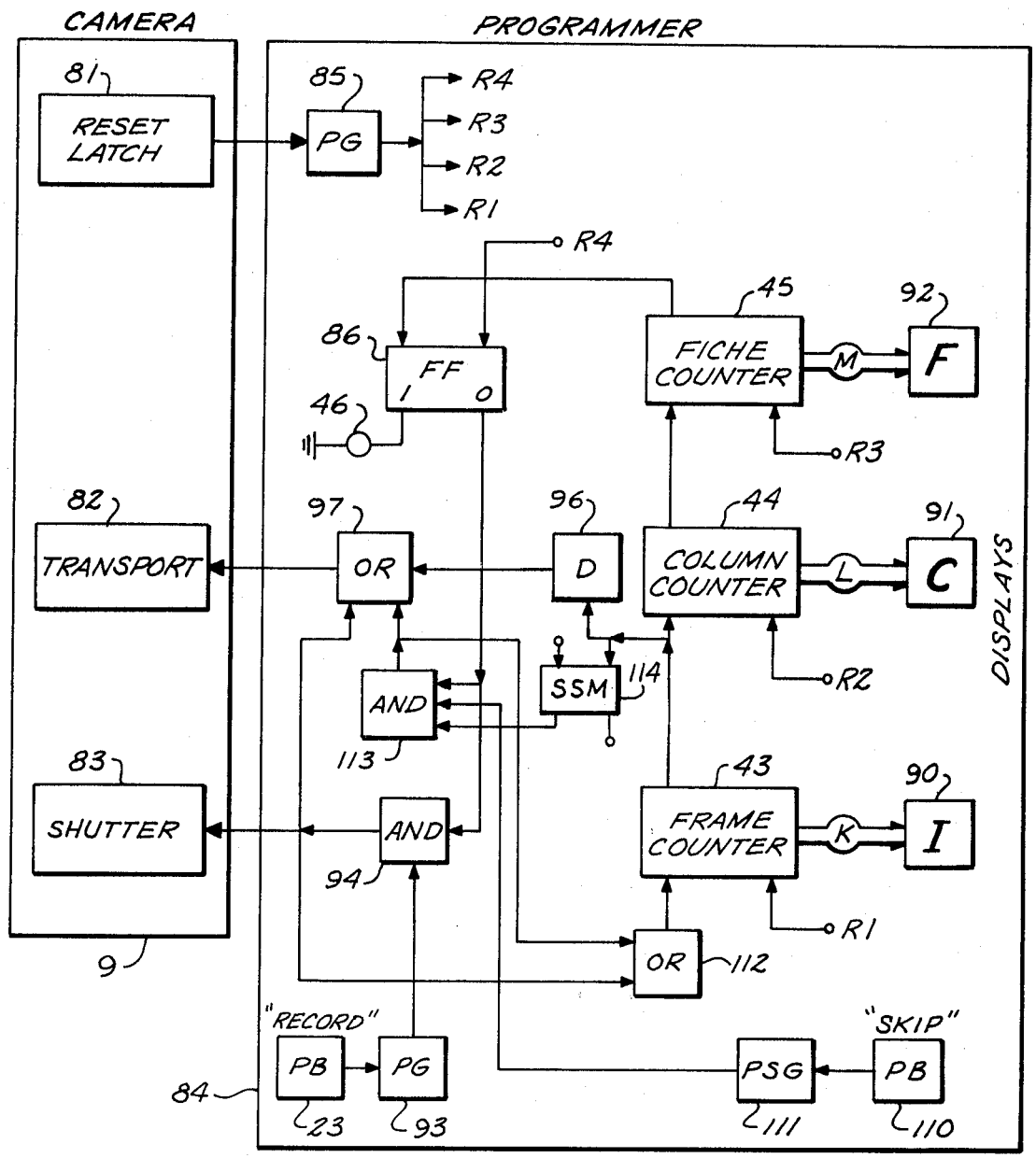

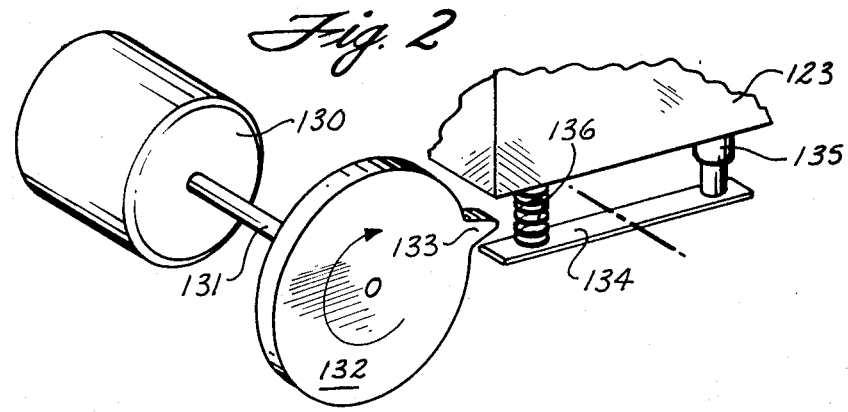
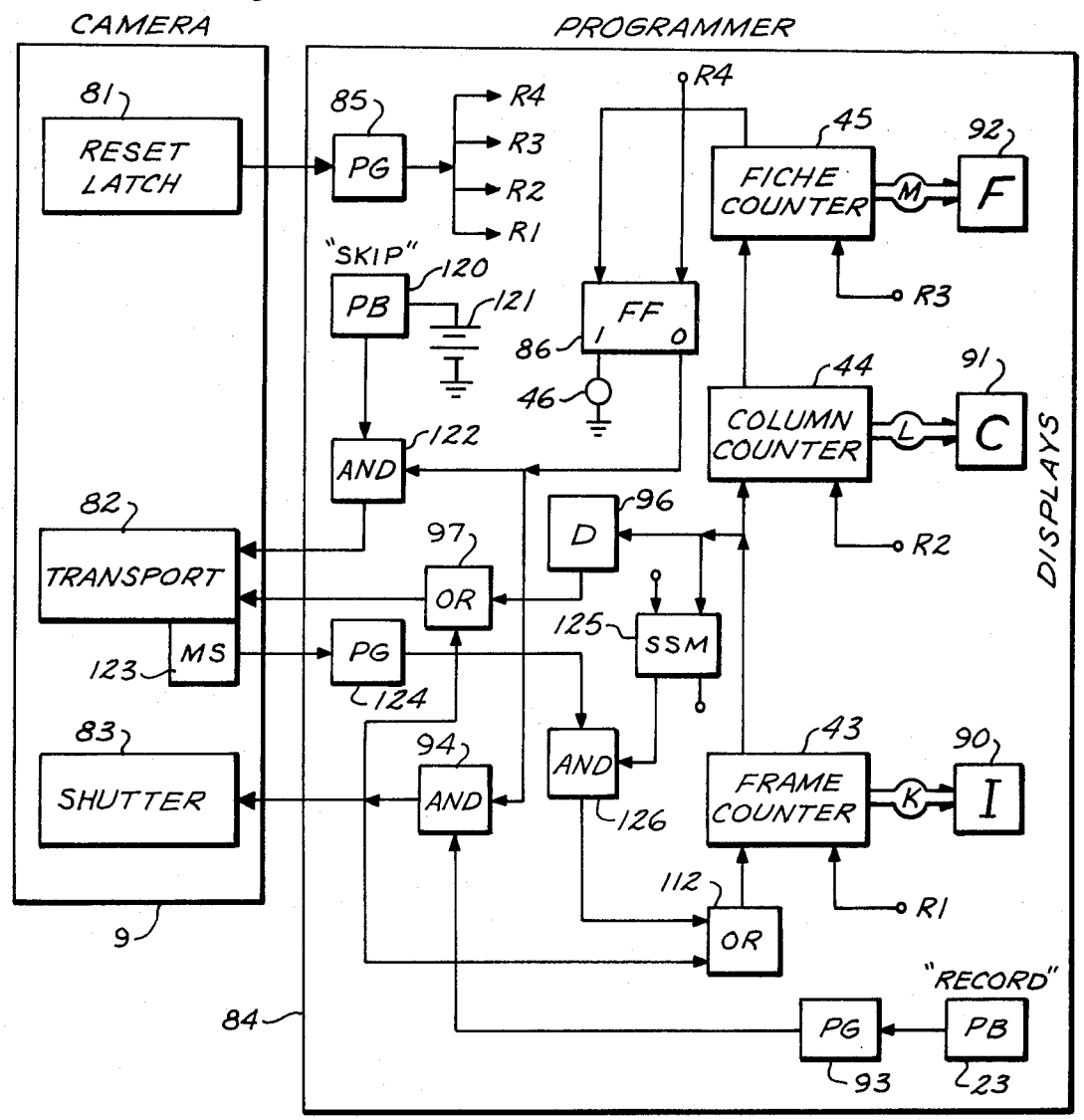

3,672,769
FICHE CAMERA WITH SELECTIVE FRAME SKIP MECHANISM
Dan C. Ross, Bethesda, Md., assignor to U.S. Dynamics Inc., Elmsford, N.Y.
Filed Apr. 26, 1971, Ser. No. 137,158
Int. Cl. G03b 27/52
U.S. Cl. 355—40                                   6 Claims

ABSTRACT OF THE DISCLOSURE

A fiche camera arrangement is provided for exposing frames of a film strip which subsequently is converted to a matrix array of photographic frames on a fiche, and the camera includes a skip arrangement for selectively advancing the film by (1) one or more frames in the column of a fiche, (2) one or more columns in a fiche, or (3) one or more fiches in a reel of film. A fiche coordinate counting arrangement is provided for visually displaying the frame, column, and fiche numbers as the strip film is exposed. Selective skipping is accomplished by operating the film transport mechanism and the fiche coordinate counting arrangement each time the skipping arrangement is operated. If a preferred fiche making process is employed, which process requires skipping one frame after each fiche column, then the skipping arrangement is inhibited from operating the fiche coordinate counting arrangement whenever a frame following a fiche column is skipped.

CROSS REFERENCES TO RELATED APPLICATIONS

Application Ser. No. 137,270 filed on Apr. 26, 1971 for Method of Making a Matrix of Photographs From a Film Strip, by Julian Silver.

Application Ser. No. 137,215 filed on Apr. 26, 1971 for Fiche Camera Device, by John E. Blackert.

Application Ser. No. 136,794 filed on Apr. 23, 1971 for Fiche Camera Arrangement, by Dan C. Ross.

BACKGROUND OF THE INVENTION

This invention relates to camera devices, and more particularly to cameras used to make fiches.

Certain types of fiche camera arrangements are employed which count and visually present the frame number of a fiche column, the column number of a fiche, and the fiche number of a reel of film as exposures are made on a strip film. The strip film thereafter is developed and converted into a matrix array of photographic frames disposed in columns and rows on a fiche. It facilitates the preferred fiche making process to skip a frame after each fiche column, and for this purpose the fiche coordinate counting arrangement is not operated when such frames are skipped.

In some cases it is desirable during the recording process to skip the remaining frames of the given column whenever no further information is to be recorded in that column. Also, it is desirable in such fiche camera arrangements to skip the remaining columns of a given fiche when no further information is to be recorded in that fiche, and it further is desirable to be able to skip the remaining fiches in a reel whenever no further information is to be recorded therein. The ability to skip is useful in organizing and arranging documents in a desired format on a fiche. It is preferable when skipping unused frames to do so without exposing such frames. Skipping of selected frames may be accomplished by performing recording operations without recording an image. In this case the skipped frames are dark after the film is developed. However, the use of a record cycle to skip frames in such cameras involves needless wear and tear on certain parts of the camera and its control mechanisms. Furthermore operator time may be saved where the skipping of many frames can be done at a rate which is higher than the maximum rate of the recording cycles. Moreover, flexibility provided by being able to skip selectively, without operating the shutter, eliminates the burden on the operator of removing documents from the view of the camera as required when the recording cycles are used to skip frames. It is to the problem of providing a flexible and rapid skipping feature that this invention is directed.

SUMMARY OF THE INVENTION

It is a feature of this invention to provide a fiche camera arrangement which incorporate a skipping feature which is inexpensive to manufacture and maintain.

It is a feature of this invention to provide a fiche camera arrangement which registers and displays fiche coordinates as a strip film is exposed and permits selected frames to be skipped with a minimum of wear and tear on the component parts of a camera, particularly the shutter.

It is a feature of this invention to provide an improved fiche camera arrangement wherein fiche coordinates are displayed during the recording process and wherein a skipping feature is provided which permits selective skipping of frames, columns, or fiches which are visible to the operator as the skipping takes place whereby skipping may be terminated when a desired frame is reached.

It is a still further feature of this invention to provide an improved fiche camera arrrangement with a skipping feature which is efficient and reliable in operation and inexpensive to manufacture and maintain.

In one arrangement according to this invention a fiche camera arrangement is provided for recording documents on photographic frames of a film strip which thereafter is converted to an array of photographic frames on a fiche. The camera includes a reel for holding strip film, a transport mechanism coupled to the reel of strip film for advancing the film, and a shutter mechanism for exposing frames of a strip film. A record mechanism is coupled to the transport mechanism and the shutter mechanism. Each time the record mechanism is operated, it operates the transport mechanism and the shutter mechanism. A fiche coordinate counting arrangement is coupled to the record mechanism, and the fiche coordinate counting arrangement responds to the operation of the record mechanism to register the number of the frame in a fiche column which is disposed behind the shutter, the number of the fiche column for such frame, and the number of the fiche in the reel of film for such column. A skipping arrangement is coupled to the transport mechanism and the fiche counting arrangement. The skipping arrangement includes a switch which is manipulated to operate the skipping arrangement. The transport mechanism is operated each time the switch is operated. The fiche coordinate counting arrangement is operated each time the switch is operated except when the fiche coordinate counting arrangement has a predetermined condition. The predetermined condition signifies that the last frame in each fiche column has been exposed. In this case the skipping arrangement inhibits the operation of the fiche coordinate counting means for one frame advanced by the transport mechanism.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 1 illustrates one embodiment according to this invention.

FIGS. 2 and 3 illustrate another embodiment according to this invention.

DESCRIPTION OF THE PREFERRED EMBODIMENTS

Reference is made to FIG. 1 which illustrates an improved camera according to this invention for selectively skipping frames under operator control. The camera is preferably of the type illustrated and described in the copending applications referenced above. The camera 9 is illustrated schematically, and it is connected to a programmer 84. The camera includes a reset switch 81 for resetting the programmer, a transport for advancing film, and a shutter 83 for making exposures during record operations. A record switch 23 is operated to actuate the shutter 83 and photographically record documents on frames of a reel of film. A skip switch 110 is operated to advance the film. It is preferable, but not necessary, to advance the film during skipping operations without making an exposure. A frame counter 43 indicates the frame of film disposed behind the shutter. A two stage column counter 44 indicates the number of the fiche column being exposed, and the fiche counter 45 indicates the number of the fiche on a reel of film being exposed. Whenever the last fiche on a reel of film is exposed, the end film light 46 is illuminated, and the operator replaces the cartridge of film with another. The reel of film is removed, developed, and converted into a plurality of fiches. There are several ways to convert the developed film to fiches, and a preferred method is illustrated and described in copending application Ser. No. 137,270 filed on Apr. 26, 1971 for Method of Making a Matrix of Photographs From a Film Strip, by Julian Silver. Next the programmer is described.

The programmer 84 in FIG. 1 includes a pulse generator 85 which has output lines R1 through R4. The pulse generator 85 is operated by the latch 81 to reset the programmer 84. The output lines R1 through R3 are connected to the reset input of respective counters R1 through R3. The output line R4 is connected to the reset input of a flip-flop 86. The counters 43 through 45 are connected to respective display devices 90 through 92 which visually present the count registered by the associated counters. The registered count may be displayed as numbers, letters, or a combination of both. The record switch 23 is a pushbutton switch which is depressed each time the camera is operated. The pushbutton switch is connected to a pulse generator 93 which in turn is connected to an And circuit 94. The output of the And circuit 94 is connected to the shutter 283 thereby to actuate the shutter, an Or circuit 97 the output of which operates the transport 82, and an Or circuit 112 operates the counter 43. Each of these functions are performed each time a recording operation takes place. The frame counter 43 has an output connected to the column counter 44, and this output is connected also to a delay circuit 96. The output of the delay circuit 96 is connected through the Or circuit 97 to the transport mechanism 82. Each time the frame counter 43 operates the column counter 44, the output signal from the frame counter 43 is delayed by the delay circuit 96 until the transport mechanism 82 has completed its advancement of the film after a recording operation, and then an output signal is supplied from the delay circuit 96 through the And circuit 94 and the Or circuit 97 to the transport 82 which then skips another frame. This frame is skipped without operating the shutter 83. A single shot multivibrator 114 receives the output signal from the counter 43. The column counter 44 has an output connected to the fiche counter 45. The column counter 44 provides an output signal which operates the fiche counter 45 each time the last column in a fiche is exposed. The fiche counter 45 has an output line connected to the 1 or set input of the flip-flop 86. There is an output signal from the fiche counter 45 which operates the flip-flop 86 whenever the last frame of the last fiche in a reel of film is exposed. The display devices 91 always indicate the current column of the current fiche being exposed. The display device 90 preferably indicates the identity of the frame behind the shutter before this frame is exposed. However, it may be used to indicate the last frame previously exposed if this is desired. The letters I, C, and F disposed in the display devices 90 through 92 in FIG. 1 represent the fiche coordinate count of each frame. The display device 90 displays the current frame number I within the current C ($I\epsilon\{1, 2, \ldots, K\}$), and the display device 90 displays the current column number C within the current fiche F ($C\epsilon\{1, 2, \ldots, L\}$). The display device 92 displays the current fiche number F within the current cartridge ($F\epsilon\{1, 2, \ldots, M\}$).

A pushbutton switch 110 is depressed to perform one or more skip operations. When the skip switch 110 is depressed, a pulse stream generator 111 supplies a sequence of spaced electrical pulses to an And circuit 113. If the flip-flop 86 is in the zero state when these pulses are applied, the And circuit 113 passes the pulses from the pulse stream generator 111 through the Or circuit 97 to the transport mechanism 82. The pulse from the And circuit 113 are supplied also through the Or circuit 112 to advance the frame counter 43 each time they advance transport mechanism 82 by one frame. As long as the skip switch 110 is depressed the pulses continue, and the transport mechanism 82 continues to advance the film; and the frame counter 43 operates to count each frame until the skip switch 110 is released. It is pointed out that the frame counter 43 supplies an output signal through the delay circuit 96 and the Or circuit 97 to operate the transport 82 whenever the frame counter 43 overflows and increments the column counter 44. This takes place when the last frame of a fiche column is reached. If the skip switch 110 is depressed to operate the pulse stream generator 111, the And circuit 113, and the Or circuit 97 and the transport mechanism 82 for the last frame of a column, this causes the frame counter 43 to overflow. The overflow signal from the frame counter 43 operates the single shot multivibrator 114 which then changes from its quiescent state to its unstable state. When the single shot multivibrator 114 is in the unstable state, it deconditions the And circuit 113 for a sufficiently long period of time to prevent the next pulse from the pulse sequence generator 111 from passing through the And circuit 113. However, the overflow signal is delayed in the delay circuit 96 until the transport 82 completes its cycle of advancing the film by one frame, and then the delay circuit 96 supplies an output signal through the Or circuit 97 to operate the transport 82 through another cycle of advancing the film by one frame. The single shot multivibrator 114 remains in the unstable state until the next pulse from the pulse sequence generator 113 is applied to the And circuit 113. The And circuit 113 then cannot pass this pulse. After this pulse terminates, the single shot multivibrator 114 changes from its unstable state to its quiescent state. Thus the transport mechanism 82 is advanced while the frame counter 43 is inhibited from operation. It is pointed out that the single pulse generator 93 and the pulse stream generator 111 preferably are provided with suitable circuits which avoid pulse-splitting effects by conventional techniques employed in the design of electronic or electromagnetic relay circuitry. For a more detailed description of one implementation of the skip feature and the record feature in a fiche camera using electromagnetic relay, reference is made to copending application Ser. No. 137,215 filed on Apr. 26, 1971 for Fiche Camera Device, by John E. Blackert.

The skip feature in FIG. 1 provides flexibility in a fiche camera arrangement which uses strip film. It permits frames of any column to be skipped whenever there is no further information to be recorded in such column. Also, it permits an operator to skip one or more columns in a fiche whenever no further information is to be recorded in the remaining columns in a given fiche. Moreover, an operator may skip the remaining fiches of a reel of film whenever no further information is to be recorded. The flexibility is provided thereby in formating recorded frames on a fiche. The operator may terminate skipping operations at any time merely by releasing the skip pushbutton 110. He readily may determine at what position he wishes to commence recording operations merely by observing the count displayed by the display devices 90 through 92. When the counters 43 through 45 display the desired frame number, column number, and fiche number, the pushbutton switch 110 is released.

When a reel of film has been exposed, it is removed and another inserted. A cartridge of 8 millimeter film 50 feet in length preferably is employed. In a preferred arrangement the fiche has sixteen columns with each column having ten exposed frames. One frame is skipped between exposed columns for fiche-making purposes. An adequate length of film is thus provided to permit reeling the film a short distance before recording commences and a sufficient distance after recording is completed thereby to insure that no ambient light reaches the frames used for recording purposes. When a new cartridge is inserted in the camera 9 in FIG. 1, the reset latch 81 is operated by manual means not shown, and the latch 81 provides an output signal which operates the pulse generator 85. The pulse generator 85 in turn provides an output signal on the lines R1 through R4 and this output signal resets respective counters 43 through 45 to their home position, and the flip-flop 86 is reset to the 0 state. The frame counter 43 preferably registers the value of 1 in the home position, and the display device 90 visually displays the value of 1. The column counter 44, preferably a two stage counter, registers the value of 01 in the home position, and the display device 91 visually displays the value 01. The fiche counter 45 registers the value of 1 in the home position, and the display device 92 visually displays the value of 1. When the flip-flop 86 is reset to the zero state, the output signal from the zero side of this flip-flop conditions one input to the And circuits 94 and 113, and the camera equipment then is ready to commence respective recording or skipping operation.

An exposure of a document is made by depressing the record switch 23 in FIG. 1. When the record switch 23 is depressed, it operates the pulse generator 93. The pulse generator 93 in turn provides an output signal which operates the And circuit 94 since both of its inputs are energized, and the And circuit 94 provides an output signal which operates the shutter 83 to make an exposure. The output signal from the And circuit 94 also operates the frame counter 43 thereby to advance it by one count, the frame counter 43 in FIG. 5 then registers the value of 2 which is visually displayed on the face of the display device 90. It is pointed out that the presentation on the display devices 90 through 92 in FIG. 1 are visible on the face of the camera in windows, not shown, which are labelled respectively as the frame, column, and fiche. This visual presentation permits the operator to record the fiche number, the column number, and the frame number of the recorded document for indexing purposes. The And circuit 94 also supplies its output signal through the Or circuit 97 to the film transport 82. The film transport 82 responds to this signal and advances the film by one frame.

As documents are recorded on successive frames of the film strip, the shutter 83, the film transport 82, and the frame counter 43 are operated. As the frame counter 43 is successively incremented, the registered count is displayed by the display device 90. After the tenth frame is exposed, the frame counter 43 provides an output signal which represents an end-carry or overflow signal to the column counter 44. The column counter 44 is incremented from the value of 1 to the value of 2. The display device 91 then registers the value of 02. The end-carry signal from the frame counter 43 is supplied to the delay circuit 96. This signal is delayed in the circuit 96 sufficiently long to permit the film transport 82 to complete its cycle of moving the exposed frame from behind the shutter 83. Thereafter the delayed signal in the circuit 96 is supplied through the Or circuit 97 to operate the film transport 82 again. The shutter 83 is not operated in this instance for reasons pointed out above. Thus the film transport 82 advances this frame without exposure. This completes the recordings in column 1 of fiche 1. If recording operations continue, eventually the last frame of column 16 is exposed. When this event takes place, the counter 44 provides an overflow or end-carry output signal to the fiche counter 45. The fiche counter 45 then is incremented from the value of 1 to the value of 2. The display device 92 then displays the value of 2. It is pointed out that after the tenth frame of each column is exposed, the output signal from the frame counter 43 increments the column counter 44 and passes through the device circuit 96 and the Or circuit 97 to advance the film transport 82 thereby to advance the film by one frame. This takes place ten times in the process of completing the exposures of fiche 1. Each time the tenth frame of the sixteenth column is exposed, the column counter 44 increments the fiche counter 45. After the fiche counter 45 is incremented ten times, it provides an end-carry signal which sets the flip-flop 86 to the 1 state. The 0 output side of the flip-flop 86 then provides an output signal which deconditions or deactivates the And circuit 94, and no further recording or skipping operations may take place even if the record switch 23 is operated or the skip switch 110 is operated. The end film lamp 46 is illuminated by a signal from the one output side of the flip-flop 86. The end film lamp is visible on the face of the camera. When this lamp is illuminated, it signifies that all fiches of the column have been exposed. The operator then replaces the cartridge with another one, and operates the latch 81 to perform a reset operation of the programmer 84, and the recording process may continue with the new cartridge.

Reference is made to FIGS. 2 and 3 which illustrate an alternative arrangement according to this invention for performing selective skipping operations by the operator. The same reference numerals employed in FIG. 1 are employed in FIG. 2 to designate corresponding parts. The operation of the circuit in FIG. 2 is the same as that in FIG. 1 for all operations except skipping operations, and the ensuing discussion is directed to the changes relating to the skipping operations. The And circuit 113 in FIG. 1 has been eliminated in FIG. 3, and other components have been added. The added components in FIG. 3 next are described.

A battery 121, a skip pushbutton switch 120, and an And circuit 122 are connected as shown to the transport 82. Whenever the pushbutton switch 120 is depressed and the flip-flop 86 is in the 0 state, power from the battery 121 is supplied through the And circuit 122 to operate the transport 82. The transport 82 has a microswitch 123 which is connected to a pulse generator 124. The pulse generator 124 is connected to an And circuit 126. The output of the frame counter 43 is connected to the delay circuit 96, and it is connected also to a single shot multivibrator 125 which in turn is connected to the And circuit 126.

Reference is made next to FIG. 2 which illustrates in greater detail the microswitch 123 shown in block form in FIG. 3. A motor 130 of the transport 82 drives a shaft 131 which advances film in a cartridge not shown. A circular member 132 has a projection 133. The shaft 131 is shown in the home position. When the shaft 131 makes one revolution, it advances the film by one frame. As the shaft 131 begins to rotate, the projection 133 engages a pivoted arm 134 thereby forcing this arm downwardly around a pivot point disposed in the center thereof. This causes the right end of this arm to move upwardly thereby forcing a switch arm 135 upwardly. When the switch arm 135 moves upwardly, it operates the microswitch 123 which in turn operates the pulse generator 124 in FIG. 3. After the projection 133 passes beyond the arm 134, it is returned by the spring 136 to the position shown in FIG. 2. Thus the microswitch 123 is operated each time the motor 130 advances the film by one frame.

The operation of the arrangement in FIG. 3 is discussed. Record operations are performed by depressing the record pushbutton switch 23. Each time this switch is manipulated, the shutter 83 is operated to expose a frame, the transport 82 is operated to advance the film by one frame, and the frame counter 43 is incremented as explained above with reference to FIG. 1. Next skipping operations are discussed. Whenever the switch 120 in FIG. 3 is depressed, a skipping operation takes place. If the pushbutton switch 120 is depressed continuously, successive skipping operations are performed. Whenever the pushbutton switch 120 is released, skipping operations terminate when the motor 130 in FIG. 2 returns to the home position. When the pushbutton switch 120 is depressed, power from the battery 121 is supplied through the And circuit 122 to operate the transport 82 if the flip-flop 86 is in the reset state. When the flip-flop 86 is in the reset state, it supplies a signal from its 0 output side which conditions the And circuit 97 to pass the signal supplied from the battery 121. This causes the motor 130 in FIG. 2 to operate and turn the shaft 131. As the shaft 131 rotates, it operates the microswitch 123 as explained earlier. Whenever the microswitch 123 operates, it causes the pulse generator 124 in FIG. 3 to supply a pulse to the And circuit 126. When the single shot multivibrator 125 is in its quiescent state, it supplies a signal to the And circuit 126 which conditions this And circuit to pass pulses from the pulse generator 124. A pulse passed by the And circuit 126 is supplied through the Or circuit 112 to advance the frame counter 43. If the pushbutton switch 121 is depressed continuously, the microswitch 123 is operated each time the projection 133 in FIG. 2 passes the pivoted arm 134, and the pulse generator 124 is operated to supply another pulse through the And circuit 126 and the Or circuit 112 to increment the frame counter 43. Whenever the frame counter 43 passes through its maximum count and supplies an overflow signal, this overflow signal increments the column counter 44, operates the single shot 125, and energizes the delay circuit 96. When the column counter 44 is incremented, it registers the number of the next column, and the registered count is visually displayed by the display device 91. The overflow signal from the framer counter 43 operates the single shot multivibrator 125 from its quiescent state to its unstable state. The single shot multivibrator remains in the unstable state for a given period of time, and in this state it deconditions the And circuit 126. The length of time that the single shot multivibrator 125 is in the unstable state must be sufficiently long to permit the delayed signal from the delay circuit 96 to pass through the Or circuit 97, the transport mechanism 82 to operate the microswitch 123, the pulse generator 124 to operate and supply a pulse to the And circuit 126 which terminates. After the pulse from the pulse generator 124 terminates, the single shot multivibrator 125 returns thereafter to its stable state. Thus the single shot multivibrator 125 inhibits the operation of the And circuit 126 whereby the frame counter 43 is not incremented when the film is advanced by one frame after each column. After the single shot multivibrator 125 returns to its stable state, further skipping operations may take place if the pushbutton switch 121 still is depressed.

The novel skipping arrangement in FIG. 3 permits the transport 82 to be operated by depressing the pushbutton switch 120. As long as this switch remains depressed, the transport 82 operates the microswitch and pulse generator 124 to supply pulses which increment the frame counter for each skipped frame except when an overflow condition occurs at the output of the frame counter 43. In this event the single shot multivibrator 125 is operated to supress the next pulse generated by operation of the pulse generator 124. In the novel arrangement of FIG. 1, on the other hand, the pulse generator 111 is operated by depressing the pushbutton switch 110, and successive signals from this pulse generator increment the frame counter 43, operate the transport 82, and operate the shutter 83. These operations are repeated in response to successive pulses from the pulse sequence generator 111 which are supplied as long as the pushbutton switch 110 is depressed. The arrangement in FIG. 1 preferably may be employed in a fiche camera arrangement wherein the programmer is constructed with the electronic components, and the arrangement in FIG. 3 may be preferred in a fiche camera arrangement where the programmer is constructed of mechanical or electromechanical components.

Thus unique and novel arrangements are provided for selectively skipping frames on a film strip in a fiche camera arrangement wherein the film thereafter is converted to microfiches composed of photographic frames disposed in columns and rows. Selective frames in a column, entire columns, or even entire fiches may be selectively skipped under operator control. The skipping feature requires few components to implement, and it is accordingly inexpensive to manufacture and maintain.

While the invention has been particularly shown and described with reference to preferred embodiments thereof, it will be understood by those skilled in the art that various changes in form and details may be made therein without departing from the spirit and scope of the invention.

What is claimed is:

1. A fiche camera arrangement for recording documents on photographic frames of a film strip which thereafter is converted to an array of photographic frames on a fiche, said camera arrangement including:

a reel for holding strip film, transport means coupled to said reel of strip film for advancing the film, shutter means for exposing frames of strip film, record means coupled to the transport means and the shutter means, the record means being operated to actuate the shutter means and the transport means, fiche coordinate counting means coupled to the record means, the fiche coordinate counting means responding to the operation of the record means to register the number of a frame in a fiche column which is disposed behind the shutter, the number of the frame in a fiche column which is disposed behind the shutter, the number of the fiche column for such frame, and the number of the fiche in the reel of film for such column, and a skipping arrangement coupled to the transport means and the fiche counting means, said skipping arrangement including switch means, said skipping arrangement operating said transport means each time said switch means is operated, said skipping arrangement operating said fiche coordinate counting means each time said switch means is operated except when said fiche coordinate counting means has a predetermined condition.

2. The apparatus of claim 1 wherein the skipping arrangement includes:

a pulse generator, said switch means being connected to said pulse generator, said pulse generator being coupled to said transport means and said fiche coordinate counting means, and means connected between the fiche coordinate means and said skipping arrangement which inhibits the operation of said fiche coordinate counting means whenever the fiche coordinate counting means has said predetermined condition.

3. The apparatus of claim 1 wherein the skipping arrangement includes:

a source of power connected to said switch means, said switch means being connected to said transport means, first control means connected between the transport means and the fiche coordinate counting means for operating the fiche coordinate counting means each time the transport means advances the film by one frame, and second control means connected between the fiche coordinate counting means and said first control means for inhibiting the operation of the fiche coordinate counting means each time the fiche coordinate counting means has said predetermined condition.

4. A fiche camera arrangement for recording documents on photographic frames of a film strip which thereafter is converted to an array of photographic frames on a fiche, said camera arrangement including:

a reel for holding strip film, transport means coupled to said reel of strip film for advancing the film, shutter means for exposing frames of strip film, record means coupled to the transport means and the shutter means, the record means being operated to actuate the shutter means and the transport means, fiche coordinate counting means coupled to the record means, the fiche coordinate counting means responding to the operation of the record means to register the number of a frame in a fiche column which is disposed behind the shutter, the number of the frame in a fiche column which is disposed behind the shutter, the number of the fiche column for such frame, and the number of the fiche in the reel of film for such column, display means coupled to the fiche coordinate counting means for displaying said frame, column, and fiche numbers as exposures are made, a skipping arrangement coupled to the transport means and the fiche counting means, said skipping arrangement including switch means, said skipping arrangement operating said transport means each time said switch means is operated, said skipping arrangement operating said fiche coordinate counting means each time said switch means is operated except when said fiche coordinate counting means has a predetermined condition.

5. The apparatus of claim 4 wherein the skipping arrangement includes:

a pulse generator, said switch means being connected to said pulse generator, said pulse generator being coupled to said transport means and said fiche coordinate counting means, and means connected between the fiche coordinate means and said skipping arrangements which inhibits the operation of said fiche coordinate counting means whenever the fiche coordinate counting means has said predetermined condition.

6. The apparatus of claim 4 wherein the skipping arrangement includes:

a source of power connected to said switch means, said switch means being connected to said transport means, first control means connected between the transport means and the fiche coordinate counting means for operating the fiche coordinate counting means each time the transport means advances the film by one frame, and second control means connected between the fiche coordinate counting means and said first control means for inhibiting the operation of the fiche coordinate counting means each time the fiche coordinate counting means has said predetermined condition.

References Cited
UNITED STATES PATENTS

| | | | |
|---|---|---|---|
| 2,296,655 | 9/1942 | Stuart | 355—54 X |
| 3,117,491 | 1/1964 | Stern | 355—40 UX |
| 3,259,037 | 7/1966 | Wilkinson, Jr. | 355—40 X |
| 3,334,539 | 8/1967 | Kleist et al. | 355—40 |
| 3,572,925 | 3/1971 | Ables et al. | 55—54 |

SAMUEL S. MATTHEWS, Primary Examiner

E. M. BERO, Assistant Examiner

U.S. Cl. X.R.

355—54